United States Patent
Damnjanovic et al.

(10) Patent No.: US 9,369,905 B2
(45) Date of Patent: Jun. 14, 2016

(54) BATTERY POWER REPORTING FOR UE RELAYS

(71) Applicant: QUALCOMM Incorporated, San Diego, CA (US)

(72) Inventors: Aleksandar Damnjanovic, Del Mar, CA (US); Yongbin Wei, San Diego, CA (US); Durga Prasad Malladi, San Diego, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 136 days.

(21) Appl. No.: 13/896,145

(22) Filed: May 16, 2013

(65) Prior Publication Data

US 2013/0308520 A1 Nov. 21, 2013

Related U.S. Application Data

(60) Provisional application No. 61/649,187, filed on May 18, 2012.

(51) Int. Cl.
*H04W 24/10* (2009.01)
*H04W 52/02* (2009.01)

(52) U.S. Cl.
CPC .......... *H04W 24/10* (2013.01); *H04W 52/0277* (2013.01)

(58) Field of Classification Search
CPC .......................... H04W 24/10; H04W 52/0277
USPC .................................................. 370/310, 315
See application file for complete search history.

(56) References Cited

U.S. PATENT DOCUMENTS

| | | | |
|---|---|---|---|
| 2004/0242286 A1* | 12/2004 | Benco et al. ............... | 455/574 |
| 2006/0223500 A1* | 10/2006 | Osugi et al. ............... | 455/411 |
| 2008/0049653 A1* | 2/2008 | Demirhan et al. ........... | 370/311 |
| 2008/0188177 A1* | 8/2008 | Tan ..................... | H04B 7/2606 455/11.1 |
| 2008/0214187 A1* | 9/2008 | Im ..................... | H04W 52/0261 455/425 |
| 2009/0003261 A1* | 1/2009 | Kim ..................... | H04B 7/2606 370/315 |
| 2009/0239466 A1* | 9/2009 | Saitou et al. .............. | 455/11.1 |
| 2009/0247091 A1* | 10/2009 | Jalloul ................. | H04W 24/00 455/70 |
| 2009/0253469 A1* | 10/2009 | Herczog .................. | 455/573 |
| 2009/0325622 A1* | 12/2009 | Matsumura et al. ......... | 455/522 |
| 2010/0020734 A1 | 1/2010 | Nakagawa et al. | |
| 2010/0167743 A1 | 7/2010 | Palanki et al. | |

(Continued)

FOREIGN PATENT DOCUMENTS

WO 2011139088 A2 11/2011

OTHER PUBLICATIONS

International Search Report and Written Opinion—PCT/US2013/041660—ISA/EPO—Aug. 21, 2013.

(Continued)

*Primary Examiner* — Chi H Pham
*Assistant Examiner* — Robert Lopata
(74) *Attorney, Agent, or Firm* — Seyfarth Shaw LLP (57) ABSTRACT

A method of wireless communication manages the reporting of battery power for UE relays. A UE capable of serving as a UE relay receives a battery status report configuration. The battery status may be based on rate of power consumption, percentage of total battery power remaining, characteristics of particular battery type, and/or allocation of battery usage. The UE may transmit a battery status report to a base station.

20 Claims, 10 Drawing Sheets

(56) References Cited

U.S. PATENT DOCUMENTS

| | | | |
|---|---|---|---|
| 2010/0190505 A1* | 7/2010 | Shiizaki et al. | 455/452.1 |
| 2010/0296432 A1* | 11/2010 | Mehta | H04B 7/15592 370/315 |
| 2010/0302980 A1* | 12/2010 | Ji et al. | 370/311 |
| 2011/0122933 A1* | 5/2011 | Adam | H04W 40/22 375/219 |
| 2011/0216681 A1* | 9/2011 | Tao et al. | 370/311 |
| 2012/0054304 A1 | 3/2012 | Pica et al. | |
| 2012/0230265 A1* | 9/2012 | Lee et al. | 370/329 |
| 2012/0250545 A1* | 10/2012 | Papadogiannis | H04W 40/12 370/252 |
| 2012/0295650 A1* | 11/2012 | Futaki | H04W 52/0216 455/507 |
| 2013/0021932 A1 | 1/2013 | Damnjanovic et al. | |
| 2013/0045735 A1 | 2/2013 | Kim et al. | |

OTHER PUBLICATIONS

Qualcomm et al., "Relay Communication Use Case", 3GPP Draft; S1-121426-WAS-121098-Relay-Communication, 3rd Generation Partnership Project (3GPP), Mobile Competence Centre; 650, Route Des Lucioles; F-06921 Sophia-Antipolis Cedex; France, vol. SA WG1, no. Seville, Spain; 20120507-20120511, May 14, 2012, XP050625058, [retrieved on May 14, 2012] the whole document.

* cited by examiner

BATTERY POWER REPORTING FOR UE RELAYS

CROSS-REFERENCE TO RELATED APPLICATION

This application claims the benefit under 35 U.S.C. §119 (e) to U.S. Provisional Patent Application No. 61/649,187 entitled BATTERY POWER REPORTING FOR UE RELAYS, filed on May 18, 2012, the disclosure of which is expressly incorporated by reference herein in its entirety.

BACKGROUND

1. Field

Aspects of the present disclosure relate generally to wireless communication systems, and more particularly to managing and reporting battery power for UE relays.

2. Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency divisional multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example of an emerging telecommunication standard is Long Term Evolution (LTE)/LTE-Advanced (LTE-A). LTE/LTE-A are enhancements to the Universal Mobile Telecommunications System (UMTS) mobile standard promulgated by Third Generation Partnership Project (3GPP). It is designed to better support mobile broadband Internet access by improving spectral efficiency, lower costs, improve services, make use of new spectrum, and better integrate with other open standards using OFDMA on the downlink (DL), SC-FDMA on the uplink (UL), and multiple-input multiple-output (MIMO) antenna technology. However, as the demand for mobile broadband access continues to increase, there exists a need for further improvements in LTE technology. Preferably, these improvements should be applicable to other multi-access technologies and the telecommunication standards that employ these technologies.

SUMMARY

In one aspect, a method of wireless communication is disclosed. The method includes receiving a battery status report configuration of a user equipment (UE) capable of serving as a UE relay. The battery status may be based on at least one of rate of power consumption, percentage of total battery power remaining, characteristics of particular battery type, or allocation of battery usage. The method may also include transmitting a battery status report to a base station.

Another aspect discloses wireless communication apparatus having a memory and at least one processor coupled to the memory. The processor(s) may be configured to receive a battery status report configuration of a user equipment (UE) capable of serving as a UE relay. The battery status may be based on at least one of rate of power consumption, percentage of total battery power remaining, characteristics of particular battery type, or allocation of battery usage. The processor(s) may also be configured to transmit a battery status report to a base station.

In another aspect, a computer program product for wireless communications in a wireless network having a non-transitory computer-readable medium is disclosed. The computer readable medium may have non-transitory program code recorded thereon which, when executed by at least one processor, causes the processor(s) to perform operations of receiving a battery status report configuration of a user equipment (UE) capable of serving as a UE relay. The battery status may be based on at least one of rate of power consumption, percentage of total battery power remaining, characteristics of particular battery type, or allocation of battery usage. The program code may also cause the processor(s) to transmit a battery status report to a base station.

Another aspect discloses an apparatus for wireless communications and includes means for receiving a battery status report configuration of a user equipment (UE) capable of serving as a UE relay. The battery status may be based on at least one of rate of power consumption, percentage of total battery power remaining, characteristics of particular battery type, or allocation of battery usage. Means for transmitting a battery status report to a base station may also be included.

Additional features and advantages of the disclosure will be described below. It should be appreciated by those skilled in the art that this disclosure may be readily utilized as a basis for modifying or designing other structures for carrying out the same purposes of the present disclosure. It should also be realized by those skilled in the art that such equivalent constructions do not depart from the teachings of the disclosure as set forth in the appended claims. The novel features, which are believed to be characteristic of the disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout.

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

Aspects of the telecommunication systems are presented with reference to various apparatus and methods. These apparatus and methods are described in the following detailed description and illustrated in the accompanying drawings by various blocks, modules, components, circuits, steps, processes, algorithms, etc. (collectively referred to as "elements"). These elements may be implemented using hardware, software, or combinations thereof. Whether such elements are implemented as hardware or software depends upon the particular application and design constraints imposed on the overall system. LTE refers generally to LTE and LTE-Advanced.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, firmware, routines, subroutines, objects, executables, threads of execution, procedures, functions, etc., whether referred to as software, firmware, middleware, microcode, hardware description language, or otherwise.

Accordingly, in one or more exemplary embodiments, the functions described may be implemented in hardware, software, or combinations thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, flash memory, phase change memory (PCM), CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

Figure 1:
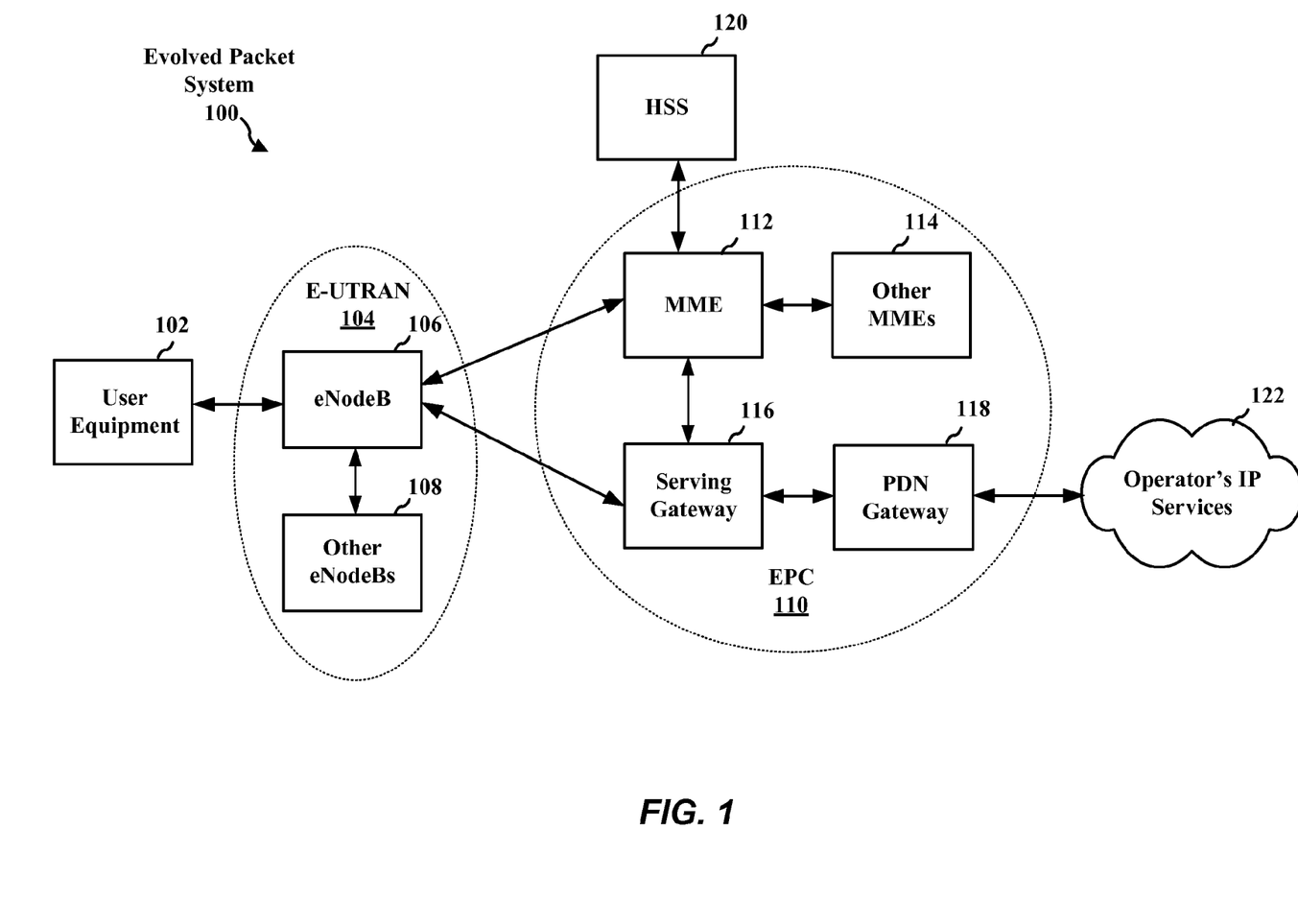
FIG. 1 is a diagram illustrating an example of a network architecture.

FIG. 1 is a diagram illustrating an LTE network architecture 100. The LTE network architecture 100 may be referred to as an Evolved Packet System (EPS) 100. The EPS 100 may include one or more user equipment (UE) 102, an Evolved UMTS Terrestrial Radio Access Network (E-UTRAN) 104, an Evolved Packet Core (EPC) 110, a Home Subscriber Server (HSS) 120, and an Operator's IP Services 122. The EPS can interconnect with other access networks, but for simplicity those entities/interfaces are not shown. As shown, the EPS provides packet-switched services, however, as those skilled in the art will readily appreciate, the various concepts presented throughout this disclosure may be extended to networks providing circuit-switched services.

The E-UTRAN includes the evolved Node B (eNodeB) 106 and other eNodeBs 108. The eNodeB 106 provides user and control plane protocol terminations toward the UE 102. The eNodeB 106 may be connected to the other eNodeBs 108 via a backhaul (e.g., an X2 interface). The eNodeB 106 may also be referred to as a base station, a base transceiver station, a radio base station, a radio transceiver, a transceiver function, a basic service set (BSS), an extended service set (ESS), or some other suitable terminology. The eNodeB 106 provides an access point to the EPC 110 for a UE 102. Examples of UEs 102 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a tablet, a netbook, a smart book, an ultrabook, a game console, or any other similar functioning device. The UE 102 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The eNodeB 106 is connected to the EPC 110 via, e.g., an S1 interface. The EPC 110 includes a Mobility Management Entity (MME) 112, other MMEs 114, a Serving Gateway 116, and a Packet Data Network (PDN) Gateway 118. The MME 112 is the control node that processes the signaling between the UE 102 and the EPC 110. Generally, the MME 112 provides bearer and connection management. All user IP packets are transferred through the Serving Gateway 116, which itself is connected to the PDN Gateway 118. The PDN Gateway 118 provides UE IP address allocation as well as other functions. The PDN Gateway 118 is connected to the Operator's IP Services 122. The Operator's IP Services 122 may include the Internet, the Intranet, an IP Multimedia Subsystem (IMS), and a PS (packet-switched) Streaming Service (PSS).

Figure 2:
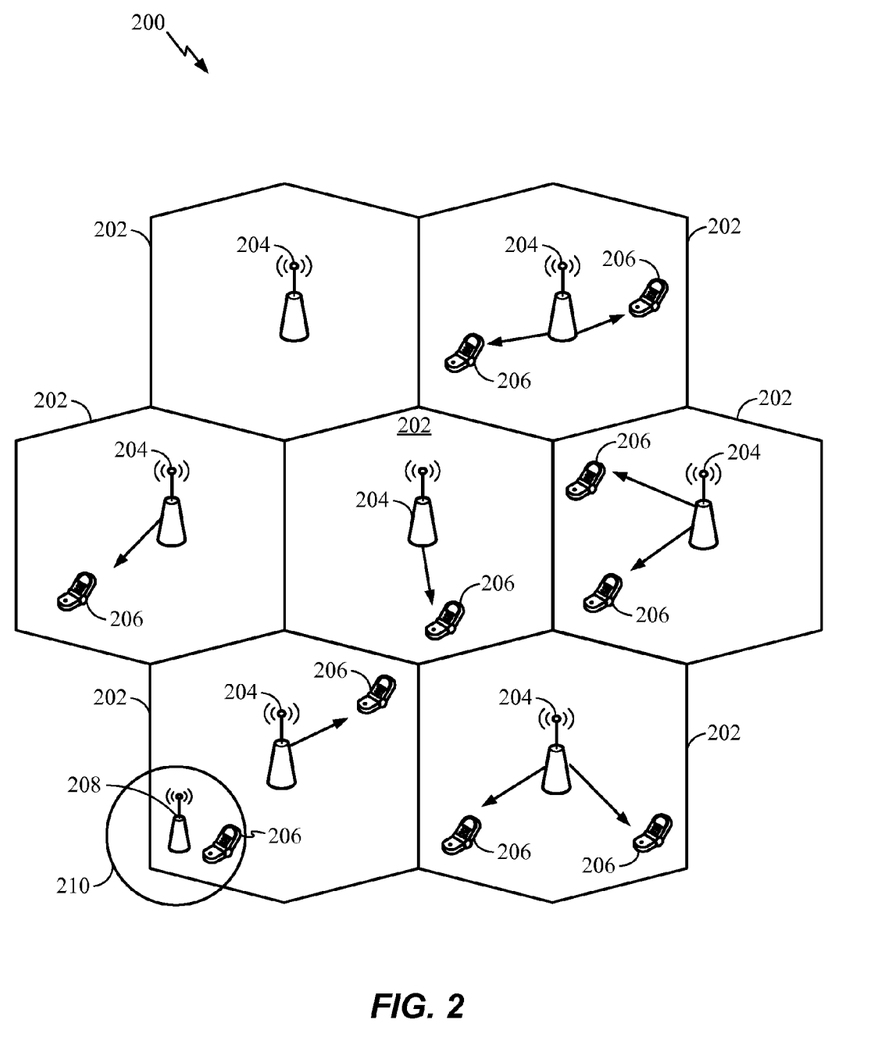
FIG. 2 is a diagram illustrating an example of an access network.

FIG. 2 is a diagram illustrating an example of an access network 200 in an LTE network architecture. In this example, the access network 200 is divided into a number of cellular regions (cells) 202. One or more lower power class eNodeBs 208 may have cellular regions 210 that overlap with one or more of the cells 202. The lower power class eNodeB 208 may be a remote radio head (RRH), a femto cell (e.g., home eNodeB (HeNodeB)), pico cell, or micro cell. The macro eNodeBs 204 are each assigned to a respective cell 202 and are configured to provide an access point to the EPC 110 for all the UEs 206 in the cells 202. There is no centralized controller in this example of an access network 200, but a centralized controller may be used in alternative configurations. The eNodeBs 204 are responsible for all radio related functions including radio bearer control, admission control, mobility control, scheduling, security, and connectivity to the serving gateway 116.

The modulation and multiple access scheme employed by the access network 200 may vary depending on the particular telecommunications standard being deployed. In LTE applications, OFDM is used on the downlink and SC-FDMA is used on the uplink to support both frequency division duplexing (FDD) and time division duplexing (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), Ultra Mobile Broadband (UMB), IEEE 802.11 (Wi-Fi), IEEE 802.16 (WiMAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNodeBs 204 may have multiple antennas supporting MIMO technology. The use of MIMO technology enables the eNodeBs 204 to exploit the spatial domain to support spatial multiplexing, beamforming, and transmit diversity. Spatial multiplexing may be used to transmit different streams of data simultaneously on the same frequency. The data steams may be transmitted to a single UE 206 to increase the data rate or to multiple UEs 206 to increase the overall system capacity. This is achieved by spatially precoding each data stream (i.e., applying a scaling of an amplitude and a phase) and then transmitting each spatially precoded stream through multiple transmit antennas on the downlink. The spatially precoded data streams arrive at the UE(s) 206 with different spatial signatures, which enables each of the UE(s) 206 to recover the one or more data streams destined for that UE 206. On the uplink, each UE 206 transmits a spatially precoded data stream, which enables the eNodeB 204 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM on the downlink. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The uplink may use SC-FDMA in the form of a DFT-spread OFDM signal to compensate for high peak-to-average power ratio (PAPR).

Figure 3:
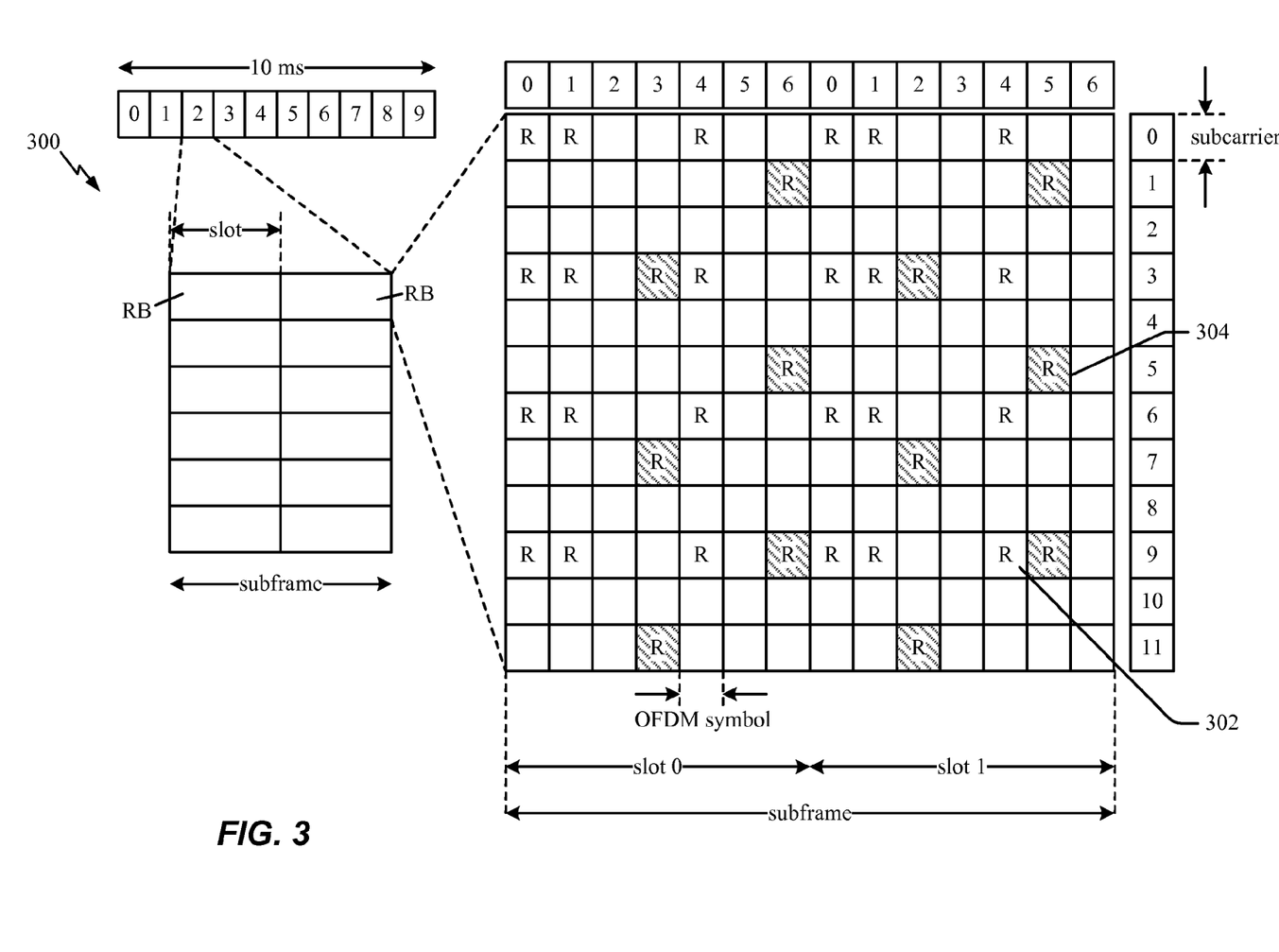
FIG. 3 is a diagram illustrating an example of a downlink frame structure in LTE.

FIG. 3 is a diagram 300 illustrating an example of a downlink frame structure in LTE. A frame (10 ms) may be divided into 10 equally sized sub-frames. Each sub-frame may include two consecutive time slots. A resource grid may be used to represent two time slots, each time slot including a resource block. The resource grid is divided into multiple resource elements. In LTE, a resource block contains 12 consecutive subcarriers in the frequency domain and, for a normal cyclic prefix in each OFDM symbol, 7 consecutive OFDM symbols in the time domain, or 84 resource elements. For an extended cyclic prefix, a resource block contains 6 consecutive OFDM symbols in the time domain and has 72 resource elements. Some of the resource elements, as indicated as R 302, R 304, include downlink reference signals (DL-RS). The DL-RS include Cell-specific RS (CRS) (also sometimes called common RS) 302 and UE-specific RS (UE-RS) 304. UE-RS 304 are transmitted only on the resource blocks upon which the corresponding physical downlink shared channel (PDSCH) is mapped. The number of bits carried by each resource element depends on the modulation scheme. Thus, the more resource blocks that a UE receives and the higher the modulation scheme, the higher the data rate for the UE.

Figure 4:
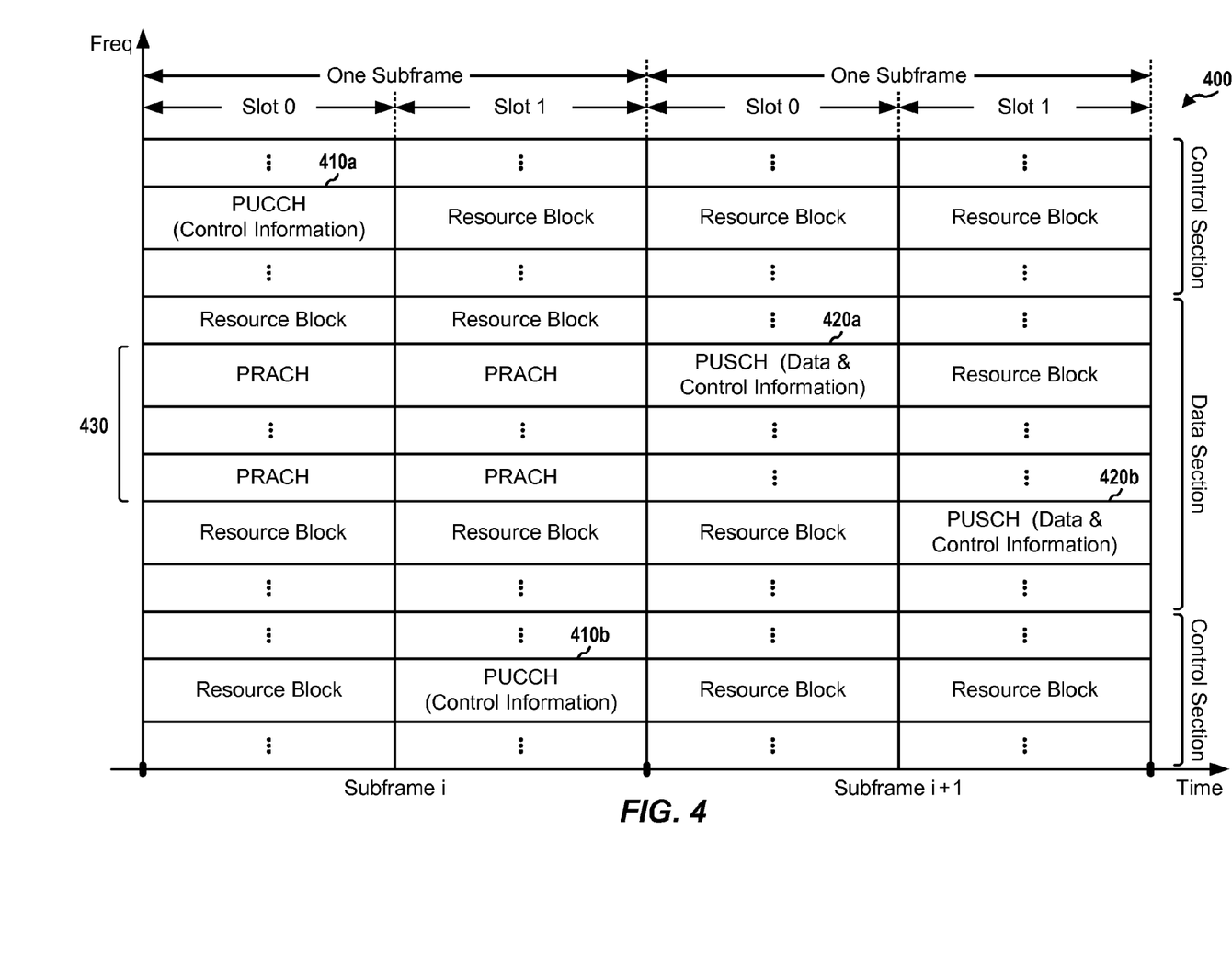
FIG. 4 is a diagram illustrating an example of an uplink frame structure in LTE.

FIG. 4 is a diagram 400 illustrating an example of an uplink frame structure in LTE. The available resource blocks for the uplink may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The uplink frame structure results in the data section including contiguous subcarriers, which may allow a single UE to be assigned all of the contiguous subcarriers in the data section.

A UE may be assigned resource blocks 410a, 410b in the control section to transmit control information to an eNodeB. The UE may also be assigned resource blocks 420a, 420b in the data section to transmit data to the eNodeB. The UE may transmit control information in a physical uplink control channel (PUCCH) on the assigned resource blocks in the control section. The UE may transmit only data or both data and control information in a physical uplink shared channel (PUSCH) on the assigned resource blocks in the data section. An uplink transmission may span both slots of a subframe and may hop across frequency.

A set of resource blocks may be used to perform initial system access and achieve uplink synchronization in a physical random access channel (PRACH) 430. The PRACH 430 carries a random sequence and cannot carry any uplink data/signaling. Each random access preamble occupies a bandwidth corresponding to six consecutive resource blocks. The starting frequency is specified by the network. That is, the transmission of the random access preamble is restricted to certain time and frequency resources. There is no frequency hopping for the PRACH. The PRACH attempt is carried in a single subframe (1 ms) or in a sequence of few contiguous subframes and a UE can make only a single PRACH attempt per frame (10 ms).

Figure 5:
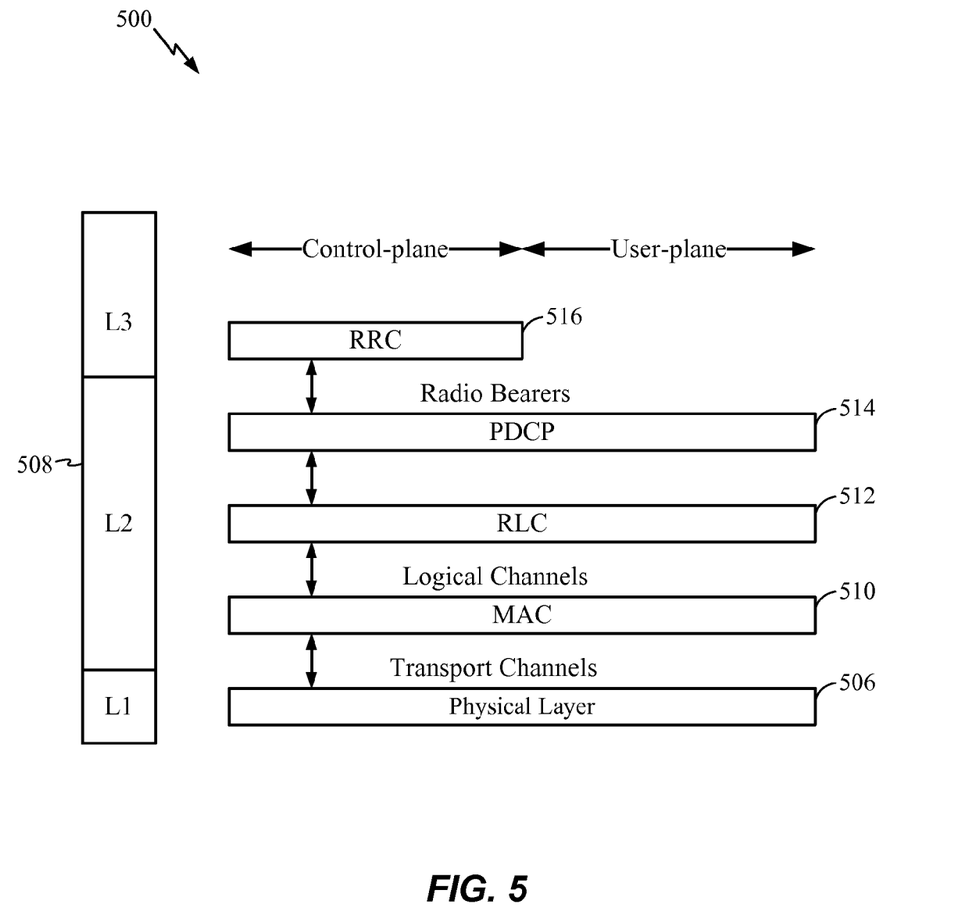
FIG. 5 is a diagram illustrating an example of a radio protocol architecture for the user plane and control plane.

FIG. 5 is a diagram 500 illustrating an example of a radio protocol architecture for the user and control planes in LTE. The radio protocol architecture for the UE and the eNodeB is shown with three layers: Layer 1, Layer 2, and Layer 3. Layer 1 (L1 layer) is the lowest layer and implements various physical layer signal processing functions. The L1 layer will be referred to herein as the physical layer 506. Layer 2 (L2 layer) 508 is above the physical layer 506 and is responsible for the link between the UE and eNodeB over the physical layer 506.

In the user plane, the L2 layer 508 includes a media access control (MAC) sublayer 510, a radio link control (RLC) sublayer 512, and a packet data convergence protocol (PDCP) 514 sublayer, which are terminated at the eNodeB on the network side. Although not shown, the UE may have several upper layers above the L2 layer 508 including a network layer (e.g., IP layer) that is terminated at the PDN gateway 118 on the network side, and an application layer that is terminated at the other end of the connection (e.g., far end UE, server, etc.).

The PDCP sublayer 514 provides multiplexing between different radio bearers and logical channels. The PDCP sublayer 514 also provides header compression for upper layer data packets to reduce radio transmission overhead, security by ciphering the data packets, and handover support for UEs between eNodeBs. The RLC sublayer 512 provides segmentation and reassembly of upper layer data packets, retransmission of lost data packets, and reordering of data packets to compensate for out-of-order reception due to hybrid automatic repeat request (HARQ). The MAC sublayer 510 provides multiplexing between logical and transport channels. The MAC sublayer 510 is also responsible for allocating the various radio resources (e.g., resource blocks) in one cell among the UEs. The MAC sublayer 510 is also responsible for HARQ operations.

In the control plane, the radio protocol architecture for the UE and eNodeB is substantially the same for the physical layer 506 and the L2 layer 508 with the exception that there is no header compression function for the control plane. The control plane also includes a radio resource control (RRC) sublayer 516 in Layer 3 (L3 layer). The RRC sublayer 516 is responsible for obtaining radio resources (i.e., radio bearers) and for configuring the lower layers using RRC signaling between the eNodeB and the UE.

Figure 6:
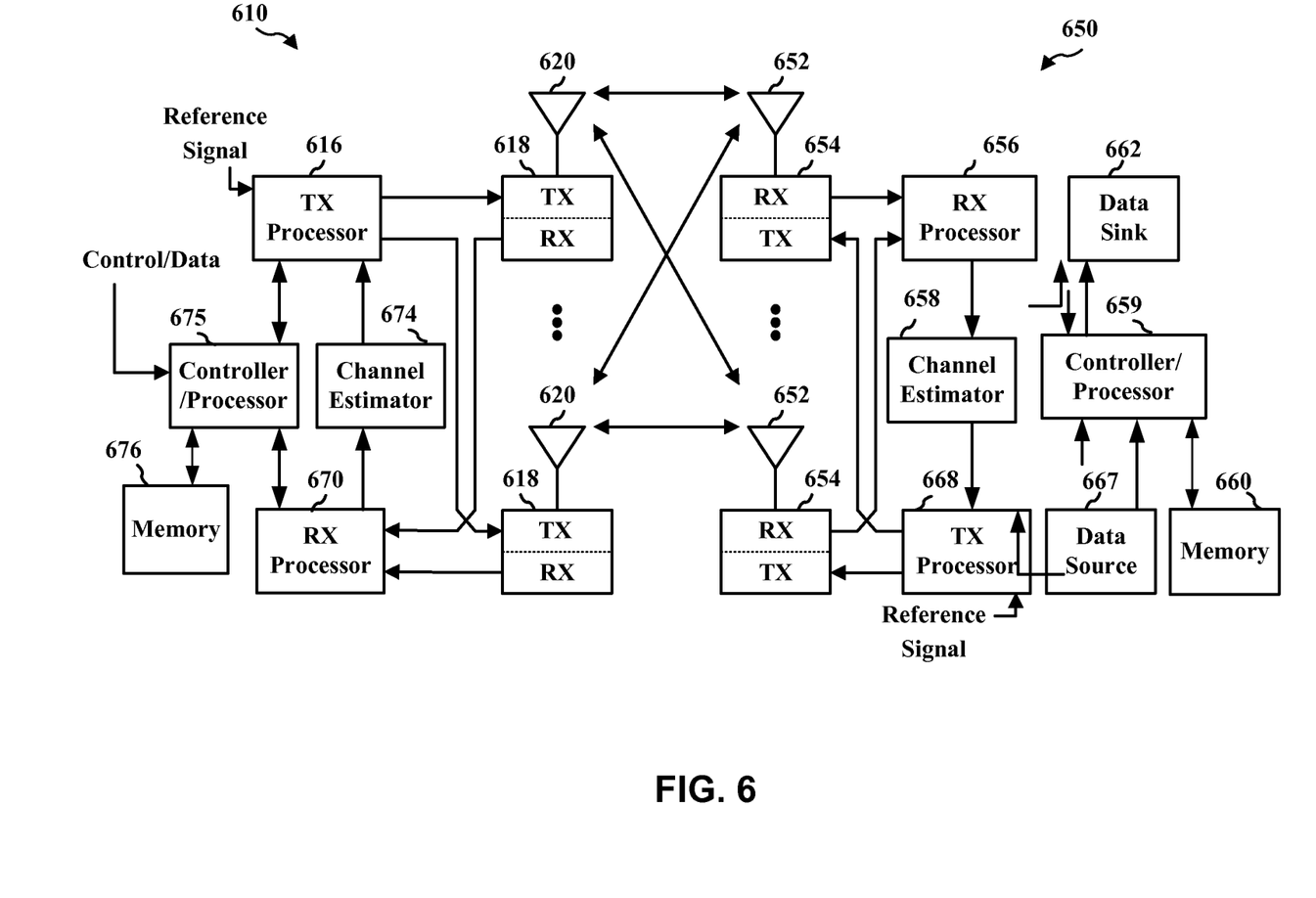
FIG. 6 is a diagram illustrating an example of an evolved Node B and user equipment in an access network.

FIG. 6 is a block diagram of an eNodeB 610 in communication with a UE 650 in an access network. In the downlink, upper layer packets from the core network are provided to a controller/processor 675. The controller/processor 675 implements the functionality of the L2 layer. In the downlink, the controller/processor 675 provides header compression, ciphering, packet segmentation and reordering, multiplexing between logical and transport channels, and radio resource allocations to the UE 650 based on various priority metrics. The controller/processor 675 is also responsible for HARQ operations, retransmission of lost packets, and signaling to the UE 650.

The TX processor 616 implements various signal processing functions for the L1 layer (i.e., physical layer). The signal processing functions includes coding and interleaving to facilitate forward error correction (FEC) at the UE 650 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 674 may be used to determine the coding and modulation scheme, as well as for spatial processing. The channel estimate may be derived from a reference signal and/or channel condition feedback transmitted by the UE 650. Each spatial stream is then provided to a different antenna 620 via a separate transmitter 618TX. Each transmitter 618TX modulates an RF carrier with a respective spatial stream for transmission.

At the UE 650, each receiver 654RX receives a signal through its respective antenna 652. Each receiver 654RX recovers information modulated onto an RF carrier and provides the information to the receiver (RX) processor 656. The RX processor 656 implements various signal processing functions of the L1 layer. The RX processor 656 performs spatial processing on the information to recover any spatial streams destined for the UE 650. If multiple spatial streams are destined for the UE 650, they may be combined by the RX processor 656 into a single OFDM symbol stream. The RX processor 656 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, is recovered and demodulated by determining the most likely signal constellation points transmitted by the eNodeB 610. These soft decisions may be based on channel estimates computed by the channel estimator 658. The soft decisions are then decoded and deinterleaved to recover the data and control signals that were originally transmitted by the eNodeB 610 on the physical channel. The data and control signals are then provided to the controller/processor 659.

The controller/processor 659 implements the L2 layer. The controller/processor can be associated with a memory 660 that stores program codes and data. The memory 660 may be referred to as a computer-readable medium. In the uplink, the control/processor 659 provides demultiplexing between transport and logical channels, packet reassembly, deciphering, header decompression, control signal processing to recover upper layer packets from the core network. The upper layer packets are then provided to a data sink 662, which represents all the protocol layers above the L2 layer. Various control signals may also be provided to the data sink 662 for L3 processing. The controller/processor 659 is also responsible for error detection using an acknowledgement (ACK) and/or negative acknowledgement (NACK) protocol to support HARQ operations.

In the uplink, a data source 667 is used to provide upper layer packets to the controller/processor 659. The data source 667 represents all protocol layers above the L2 layer. Similar to the functionality described in connection with the downlink transmission by the eNodeB 610, the controller/processor 659 implements the L2 layer for the user plane and the control plane by providing header compression, ciphering, packet segmentation and reordering, and multiplexing between logical and transport channels based on radio resource allocations by the eNodeB 610. The controller/processor 659 is also responsible for HARQ operations, retransmission of lost packets, and signaling to the eNodeB 610.

Channel estimates derived by a channel estimator 658 from a reference signal or feedback transmitted by the eNodeB 610 may be used by the TX processor 668 to select the appropriate coding and modulation schemes, and to facilitate spatial processing. The spatial streams generated by the TX processor 668 are provided to different antenna 652 via separate transmitters 654TX. Each transmitter 654TX modulates an RF carrier with a respective spatial stream for transmission.

The uplink transmission is processed at the eNodeB 610 in a manner similar to that described in connection with the receiver function at the UE 650. Each receiver 618RX receives a signal through its respective antenna 620. Each receiver 618RX recovers information modulated onto an RF carrier and provides the information to a RX processor 670. The RX processor 670 may implement the L1 layer.

The controller/processor 675 implements the L2 layer. The controller/processor 675 can be associated with a memory 676 that stores program codes and data. The memory 676 may be referred to as a computer-readable medium. In the uplink, the control/processor 675 provides demultiplexing between transport and logical channels, packet reassembly, deciphering, header decompression, control signal processing to recover upper layer packets from the UE 650. Upper layer packets from the controller/processor 675 may be provided to the core network. The controller/processor 675 is also responsible for error detection using an ACK and/or NACK protocol to support HARQ operations.

Figure 7:
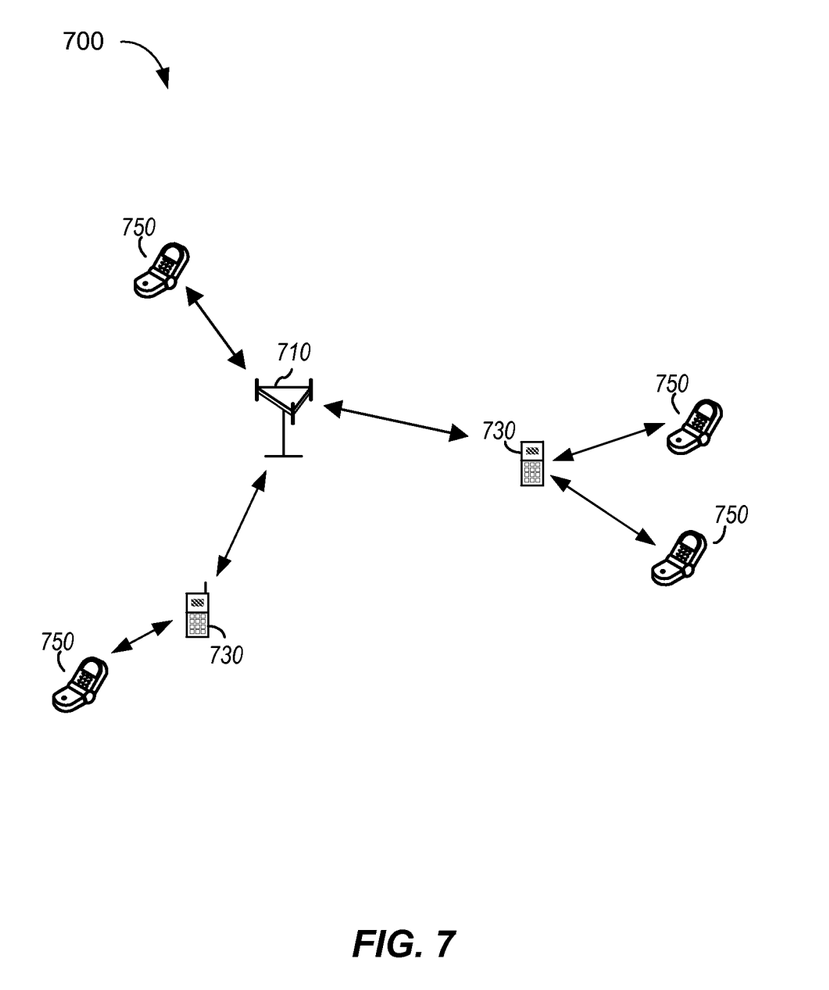
FIG. 7 is a diagram illustrating an example system including a UE relay.

FIG. 7 shows an exemplary network structure 700 that supports relay operation. The network 700 includes eNodeB 710, UEs 750, and UE relays 730. The UE relays 730 are relays with both UE and eNodeB functionality, and may be dispersed throughout a network to facilitate communication between UEs and eNodeBs. In a system utilizing UE relays 730, the eNodeB 710 may also be referred to as a donor base station or donor eNodeB (DeNB).

Typically, a relay (including the UE relay 730) is a station that receives a transmission of data and/or other information from an upstream station (e.g., an eNodeB 710 or a UE 750) and sends a transmission of the data and/or other information to a downstream station (e.g., a UE 750 or an eNodeB 710). A relay station may be a station that is dedicated to relaying transmissions for UEs. A relay station may also be a UE that relays transmissions for other UEs. The UE relay may communicate with a UE via an access link and may communicate with an eNodeB via a backhaul link in order to facilitate communication between the UE and the eNodeB. The UE relay 730 may also be referred to as a relay station, UeNodeB, and/or UeNB.

UE relays may be utilized in a network to enhance network capacity. In particular, UE relay deployment in a network may improve the signal-to-noise-plus-interference ratio (SNIR) on the backhaul link and reduce interference on the access link.

Additionally, UE relay operation may enable a UE with poor channel conditions for its eNodeB to nevertheless communicate with the eNodeB via a relay station. To facilitate relay operation, relay stations capable of relaying transmissions for UEs may transmit pilots that may allow UEs to discover these relay stations. A pilot is a signal or transmission that is known by both a transmitting station and a receiving station. A pilot may also be referred to as a reference signal, a synchronization signal, a preamble, etc. A pilot used for discovery of a relay station may be referred to as a discovery pilot. Transmission of discovery pilots all the time by all relay stations will reduce battery life of these relay stations and may be especially undesirable when there are no UEs interested in communicating with these relay stations. Various aspects of the present disclosure are directed to managing the battery power of UE relays. Also, the various aspects may be applied to various types of relays, e.g., those that are fixed nodes, those that are solar powered, those that are a combination of solar and battery powered, those that are a combination of battery and wall-plug/AC powered, etc.

Various aspects of the present disclosure are directed to overcoming the battery limitation of battery powered UE relays. In particular, the network may limit UE relay activity to conserve the battery power of the UE relays. For example, the network may limit the activity of UE relays to busy periods when extra capacity is utilized on the network. To protect the battery power, the UEs would not serve as relays during off peak hours when the demand is lower.

Additionally, in another aspect, the network alternates activation among UE relays to limit battery consumption of a single relay. For example, a set of five UEs may be selected to serve as relays over a five hour period, where the UEs take turn serving as a relay. In one example, each of the five selected UEs may serve at different times as a UE relay for a one hour period. This example reduces battery consumption by allowing each UE to serve as a relay for only one hour out of the five hour period.

In another aspect, the UE relays are configured to report their battery status to the network. In particular, the UE relays may be configured to report rate of power consumption, the percentage of remaining battery power, characteristics of the particular battery type, usage history, and/or allocation of battery usage, etc.

Additionally, the battery status report may include a battery threshold level that indicates the remaining battery capacity. In particular, threshold levels may be defined to correspond to the percentage of battery charge remaining. For example, a remaining battery charge of 20% may correspond to a low power level. A critical level may indicate 10% of the battery charge remains. And, a 5% battery charge may correspond to the power-off level.

Figure 8:
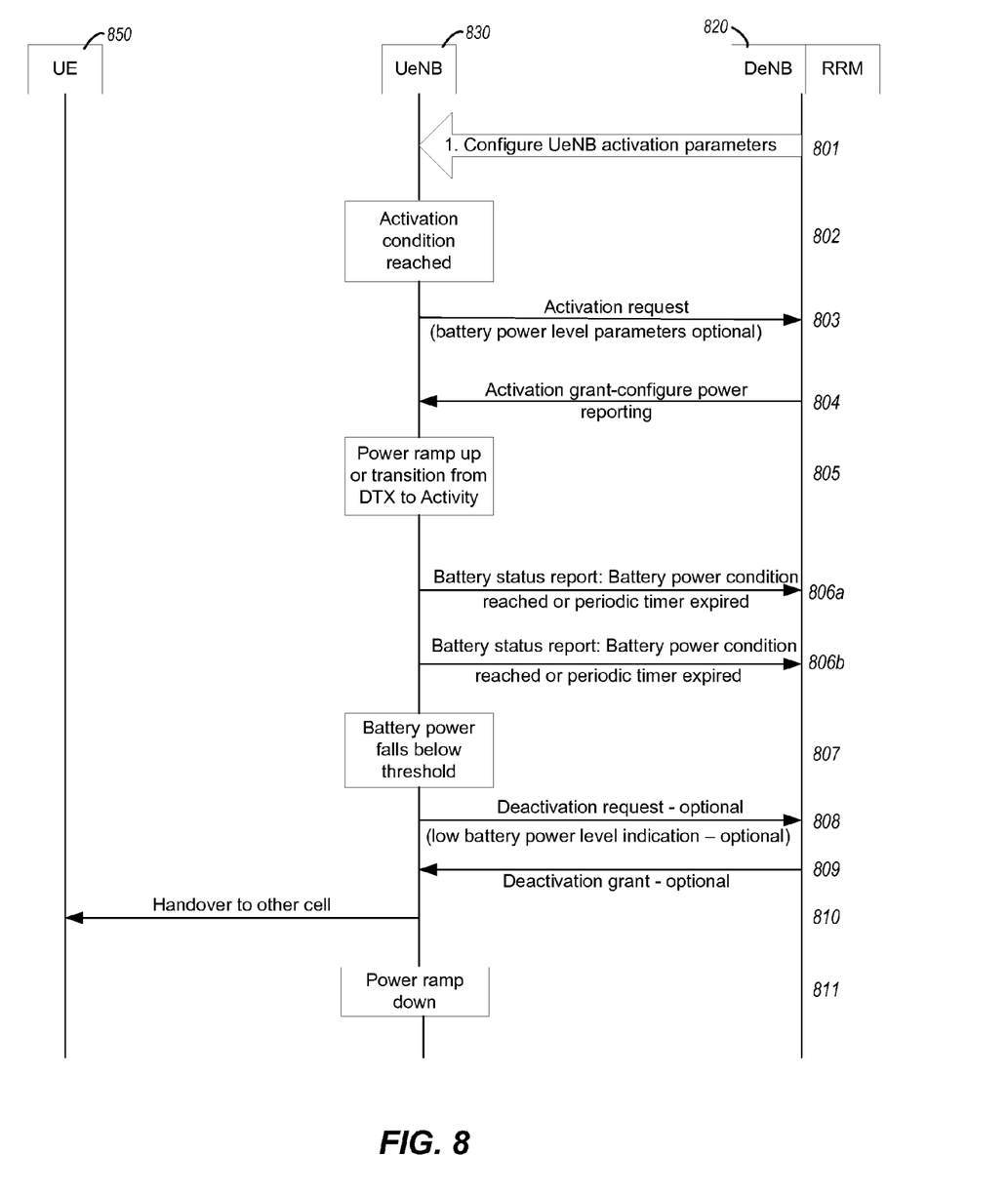
FIG. 8 is a call flow diagram illustrating a process for reporting UE relay battery status.

FIG. 8 illustrates an example of a UE relay battery reporting procedure. At time 801, a donor eNodeB/radio resource management (RRM) 820 configures activation parameters for the relay station (e.g., UeNB 830). In one aspect, the activation parameters determine when a UeNB 830 will send an activation request to the donor eNodeB 820. The activation parameters may include such criteria as battery level, radio condition, such as signal to noise ratio, reference signal receive quality (RSRQ), reference signal receiver power (RSRP) and/or path loss. For example, generally, the donor eNodeB 820 configures the activation parameters such that the UeNB 830 is triggered to send an activation request when good radio conditions are present and the battery power of the UeNB 830 is above a certain level. In another example, the activation parameter may also include triggering an activation request when the path loss is low, or below a predetermined threshold value.

At time 802, an activation condition pursuant to the configured activation parameters is reached, which triggers the UENB 830 to send an activation request. At time 803, the UeNB 830 sends an activation request to the donor eNB 820 and reports the activation condition has been reached. The activation request may include battery information such as a battery status report, battery power level parameters, etc.

At time 804, the UeNB 830 receives an activation grant from the donor eNB 820 to serve as a relay, e.g., based on transmitted battery status report. The activation grant may include a request to activate and instructions to configure battery power reporting. For example, the UeNB 830 may receive a battery status report configuration and may be configured to send periodic battery status reports at predefined time intervals. Further, the UeNB 830 may be configured to send battery status reports when a predefined condition has been reached. For example, when the level of the battery power falls below a predefined level, the UeNB 830 may be triggered to send a battery status report. In another example, the UeNB 830 on its own sends periodic battery status reports after a predefined period of time expires.

At time 805, after the UeNB 830 receives the activation grant from the donor eNB 820, the UeNB 830 transitions from DTX mode (discontinuous transmission mode) or do not transmit mode to an activated mode or, alternately, the UeNB 830 powers on.

At time 806a, a predefined condition is reached and the UeNB 830 is triggered to send a battery status report to the donor eNB 820. As discussed above, events such as the battery power level and/or the expiration of a timer could trigger the UeNB 830 to send the report to the donor eNB 820. The report may indicate, for example, a rate at which the battery is draining, an amount of power the UE has available for relay operations (which may leave some battery power left for non-relay operations), and/or a battery threshold level, etc.

At time 806b, another battery status report is sent from the UeNB 830 to the donor eNB 820. Although the call flow example illustrated in FIG. 8 shows the UeNB 830 sending two (2) battery status reports to the donor eNB 820, those skilled in the art will appreciate that any number of battery status reports may be sent. The second battery status report sent at time 806b may be triggered, for example, when a previously specified battery power condition has been reached or when a periodic time expires.

At time 807, the battery power falls below a predefined threshold value. The threshold value could be, e.g., a percentage of total amount of power remaining or an absolute amount of total remaining power. As a result, a deactivation request is sent to the donor eNB 820 at time 808. Optionally, the deactivation request may include a low battery power indication, for example percentage of battery power remaining.

After receiving the deactivation request, the donor eNB 820 sends a deactivation grant, at time 809, to the UeNB 830. The deactivation grant may include a request to deactivate. After receiving the deactivation grant, then at time 810, the UeNB 830 hands UE 850 over to another cell. At time 811, the UeNB 830 may power down, or may alternately enter a standby (or low power) state, etc.

In another aspect, the UE relay is configured to automatically switch off power when the battery power falls below a predetermined threshold. For example, at time 807 when the battery power falls below a predefined threshold value, the UeNB 830 may be configured to automatically power off or enter a standby (or low power) state, etc.

In another aspect, the UE relay may be configured to deactivate service as a relay when the battery power falls below a predetermined threshold, while signaling the eNodeB of the intent to switch off. For example, at time 807 when the battery power falls below a predefined threshold value, the UeNB 830 may signal to the donor eNB 820 its intent to deactivate service as a relay, and then deactivate itself. Similarly, if the UeNB owner decides to power off the device, the UeNB can inform the network.

In another aspect, the network controls the number of active UE relays. In particular, a limited number of UEs may be selected as a relay station for other UEs, where only the selected UEs may transmit discovery pilots. The network may request a UE to deactivate service as a relay, e.g., based on a battery status report.

In another aspect, a set of UEs with good channel conditions are selected to act as relay stations. The channel conditions may be quantified by geometry, signal-to-noise-plus-interference ratio (SINR), and/or other metrics. In another aspect, a UE relay may transmit battery information such as a battery status report during an existing idle mechanism (e.g., DTX mode) to, e.g., a donor eNB.

Alternately, a set of UEs with good power supply capability to act as relay stations are selected. These UEs may include UEs with high battery levels and/or UEs that are plugged into a fixed power source. UEs having good power supply capability may report this capability to the network and/or eNodeBs.

In one aspect, the format for the battery status report may be medium access control (MAC) control protocol data unit (PDU) (layer 2 signaling). For example, a special bit pattern inserted at the beginning of the MAC control PDU may indicate that the MAC control PDU refers to battery status report. The remainder of the message may be configured to indicate a quantized battery status. It could be either relative value compared to the full battery status, or an absolute charge level in terms of Wh (Watt-hours), or time to discharge assuming maximum or configured transmit power, or all possible combinations thereof. For example both relative and absolute levels may be included.

In yet another aspect, the signaling format may include radio resource control (RRC) signaling (layer 3). The same information as in case of layer 2 signaling may be conveyed. The main difference between layer 2 and layer 3 signaling is that layer 3 signaling is encrypted and goes through possible HARQ retransmissions, while layer 2 signaling does not.

Figure 9:
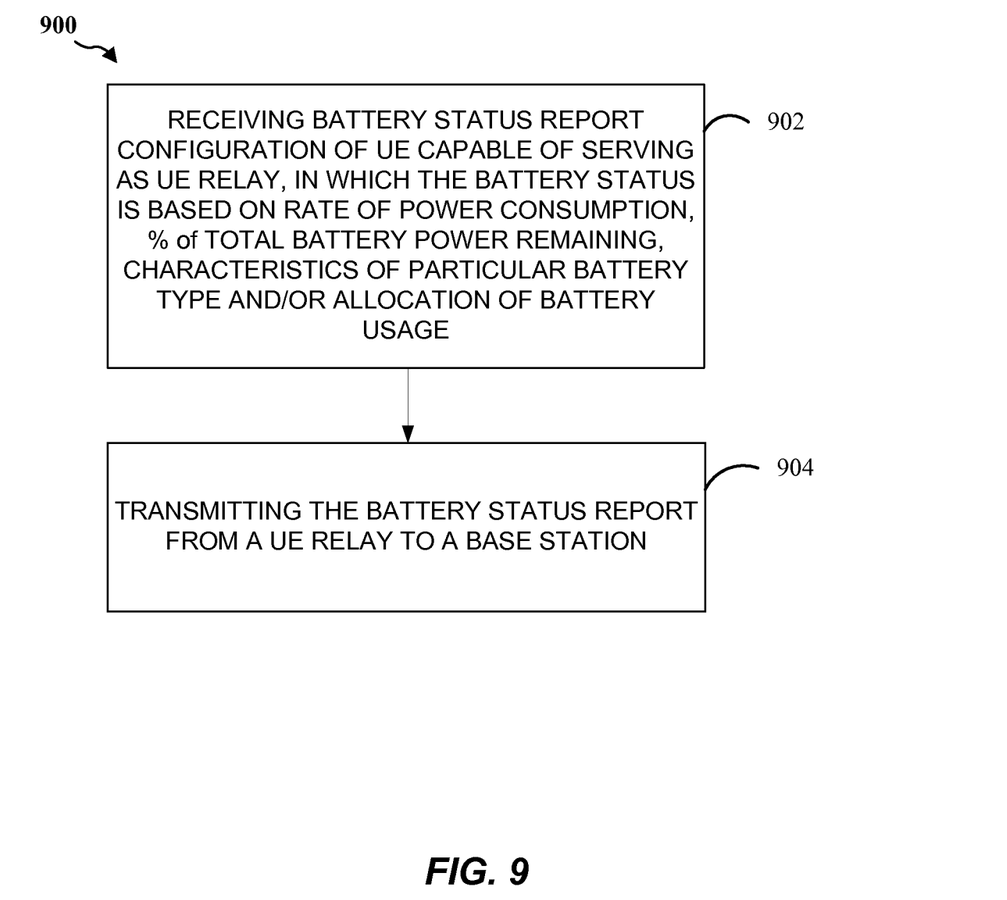
FIG. 9 is a block diagram illustrating a method for reporting battery power for a UE relay.

FIG. 9 illustrates a method 900 for reporting UE relay battery power. In block 902, a UE, e.g., a UE capable of serving as a UE relay, receives a battery status report configuration. The battery status is based on at least one of rate of power consumption, percentage of total battery power remaining, characteristics of particular battery type, and/or allocation of battery usage, etc. In block 904, the UE transmits the battery status report to a donor eNodeB.

In one configuration, the UE 650 is configured for wireless communication including means for receiving. In one aspect, the receiving means may be the receive processor 656, antenna 652, receiver (RX) 654, controller processor 659 and/or memory 660 configured to perform the functions recited by the receiving means. The UE 650 is also configured to include a means for transmitting. In one aspect, the transmitting means may be the controller/processor 659, memory 660, transmit processor 668, transmitters (TX) 654 and/or antenna 652 configured to perform the functions recited by the transmitting means. In another aspect, the aforementioned means may be any module or any apparatus configured to perform the functions recited by the aforementioned means.

Figure 10:
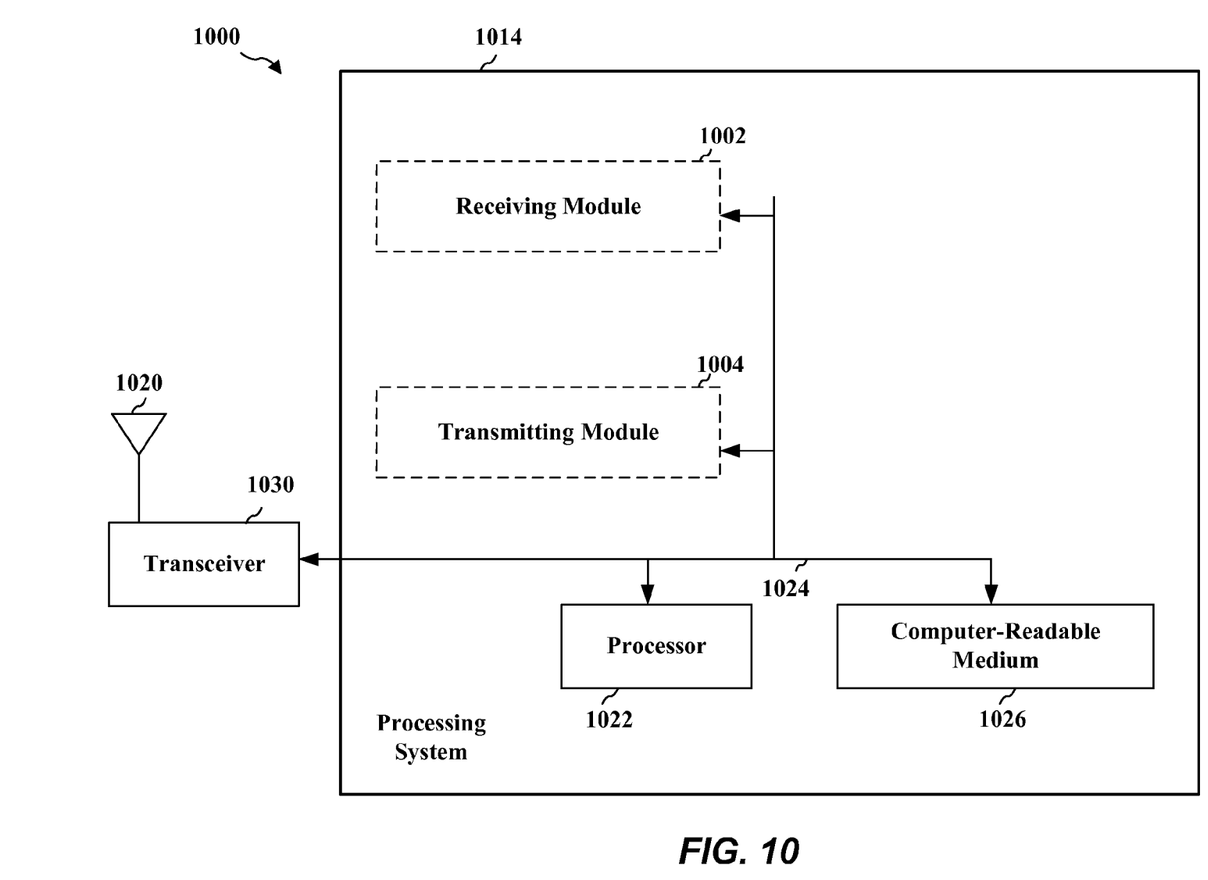
FIG. 10 is a block diagram illustrating different modules/means/components in an exemplary apparatus.

FIG. 10 is a diagram illustrating an example of a hardware implementation for an apparatus 1000 employing a processing system 1014. The processing system 1014 may be implemented with a bus architecture, represented generally by the bus 1024. The bus 1024 may include any number of interconnecting buses and bridges depending on the specific application of the processing system 1014 and the overall design constraints. The bus 1024 links together various elements including one or more processors and/or hardware modules, represented by the processor 1022, the modules 1002, 1004, and the computer-readable medium 1026. The bus 1024 may also link various other elements such as timing sources, peripherals, voltage regulators, and power management elements, which are well known in the art, and therefore, will not be described any further.

The apparatus includes processing system 1014 coupled to a transceiver 1030. Transceiver 1030 is coupled to one or more antennas 1020. The transceiver 1030 enables communicating with various other apparatus over a transmission medium. The processing system 1014 includes a processor 1022 coupled to a computer-readable medium 1026. The processor 1022 is responsible for general processing, including the execution of software stored on the computer-readable medium 1026. The software, when executed by the processor 1022, may cause the processing system 1014 to perform the various functions described for any particular apparatus. The computer-readable medium 1026 may also be used for storing data that is manipulated by the processor 1022.

The processing system includes a receiving module 1002 and a transmitting module 1004. The receiving module can receive a battery status report configuration and the transmitting module can transmit the report to a base station. The modules may be software modules running in the processor 1022, resident/stored in the computer readable medium 1026, one or more hardware modules coupled to the processor 1022, or some combination thereof. The processing system 1014 may be a component of the UE 650 and may include the memory 660, the transmit processor 668, the receive processor 656, the transmitters/receivers 654, the antenna 652, and/or the controller/processor 659.

Those of skill would further appreciate that the various illustrative logical blocks, modules, circuits, and algorithm steps described in connection with the disclosure herein may be implemented as hardware, software, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, phase change memory (PCM), registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but are to be accorded the widest scope consistent with the principles and novel features disclosed herein.

What is claimed is:

1. A method of wireless communication, comprising:
   receiving, at a user equipment (UE) capable of serving as a UE relay, a battery status report configuration of the UE, the battery status report configuration comprising a report interval, a periodicity, and at least one predefined condition for triggering reporting of a battery status, in which the battery status is based on at least one of rate of power consumption, percentage of total battery power remaining, characteristics of particular battery type, or allocation of battery usage;
   generating a battery status report based on the battery status;
   transmitting the battery status report to a base station; and
   activating the UE to serve as the UE relay based on at least one of a battery power level, a radio condition, or a path loss value.

2. The method of claim 1, further comprising receiving a request to serve as the UE relay based on the transmitted battery status report.

3. The method of claim 1, further comprising activating the transmitting based on at least one of the battery power level, the radio condition, or the path loss value.

4. The method of claim 1, in which the radio condition is indicated by a signal to noise ratio.

5. The method of claim 1, further comprising, receiving an instruction to deactivate service as the UE relay based on the transmitted battery status report.

6. The method of claim 5, further comprising allowing handover to another cell.

7. The method of claim 1, further comprising powering off the UE based on the received battery status report configuration.

8. The method of claim 1, in which the battery status report includes a battery threshold level indicating a remaining capacity of the battery.

9. An apparatus for wireless communication, comprising:
   a memory; and
   at least one processor coupled to the memory, the at least one processor configured to:
      receive, at a user equipment (UE) capable of serving as a UE relay, a battery status report configuration of the UE, the battery status report configuration comprising a report interval, a periodicity, and at least one predefined condition for triggering reporting of a battery status, in which the battery status is based on at least one of rate of power consumption, percentage of total battery power remaining, characteristics of particular battery type, or allocation of battery usage;

generate a battery status report based on the battery status;

transmit the battery status report to a base station; and activate the UE to serve as the UE relay based on at least one of a battery power level, a radio condition, or a path loss value.

10. The apparatus of claim 9, in which the at least one processor is further configured to receive a request to serve as the UE relay based on the transmitted battery status report.

11. The apparatus of claim 9, in which the at least one processor is further configured to activate the transmitting based on at least one of the battery power level, the radio condition, or the path loss value.

12. The apparatus of claim 9, in which the radio condition is indicated by a signal to noise ratio.

13. The apparatus of claim 9, in which the at least one processor is further configured to receive an instruction to deactivate service as the UE relay based on the transmitted battery status report.

14. The apparatus of claim 13, in which the at least one processor is further configured to allow handover to another cell.

15. The apparatus of claim 9, in which the at least one processor is further configured to power off the UE based on the received battery status report configuration.

16. The apparatus of claim 9, in which the battery status report includes a battery threshold level indicating a remaining capacity of the battery.

17. A computer program product for wireless communication in a wireless network, comprising:
   a non-transitory computer-readable medium having non-transitory program code recorded thereon, the program code comprising:
      program code to receive, at a user equipment (UE) capable of serving as a UE relay, a battery status report configuration of the UE, the battery status report configuration comprising a report interval, a periodicity, and at least one predefined condition for triggering reporting of a battery status, in which the battery status is based on at least one of rate of power consumption, percentage of total battery power remaining, characteristics of particular battery type, or allocation of battery usage;
      program code to generate a battery status report based on the battery status;
      program code to transmit the battery status report to a base station; and
      program code to activate the UE to serve as the UE relay based on at least one of a battery power level, a radio condition, or a path loss value.

18. The computer program product of claim 17, further comprising program code to receive a request to serve as the UE relay based on the transmitted battery status report.

19. An apparatus for wireless communication, comprising:
   means for receiving, at a user equipment (UE) capable of serving as a UE relay, a battery status report configuration of the UE, the battery status report configuration comprising a report interval, a periodicity, and at least one predefined condition for triggering reporting of a battery status, in which the battery status is based on at least one of rate of power consumption, percentage of total battery power remaining, characteristics of particular battery type, or allocation of battery usage;
   means for generating a battery status report based on the battery status;
   means for transmitting the battery status report to a base station; and
   means for activating the UE to serve as the UE relay based on at least one of a battery power level, a radio condition, or a path loss value.

20. The apparatus of claim 19, further comprising means for receiving a request to serve as the UE relay based on the transmitted battery status report.

* * * * *